(12) United States Patent
Oliver

(10) Patent No.: US 9,350,533 B2
(45) Date of Patent: May 24, 2016

(54) METHOD AND APPARATUS FOR DELIVERING ENCRYPTED CONTENT TO WEB BROWSERS BASED ON ENTROPY OF THE CONTENT

(75) Inventor: Ian Justin Oliver, Söderkulla (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 23 days.

(21) Appl. No.: 13/602,541

(22) Filed: Sep. 4, 2012

(65) Prior Publication Data

US 2014/0068244 A1   Mar. 6, 2014

(51) Int. Cl.
| | |
|---|---|
| *G06F 21/00* | (2013.01) |
| *H04L 29/06* | (2006.01) |
| *H04L 9/00* | (2006.01) |
| *G06F 17/21* | (2006.01) |
| *G06F 17/22* | (2006.01) |
| *G06F 21/60* | (2013.01) |
| *H04L 9/18* | (2006.01) |

(52) U.S. Cl.
CPC ............... *H04L 9/00* (2013.01); *G06F 17/211* (2013.01); *G06F 17/2247* (2013.01); *G06F 21/602* (2013.01)

(58) Field of Classification Search
CPC ..... H04L 29/06; H04L 29/06551; H04L 9/00; G06F 21/602; G06F 17/2247; G06F 17/211
USPC .......... 713/150; 726/22, 23; 711/133
See application file for complete search history.

(56) References Cited

U.S. PATENT DOCUMENTS

| | | | |
|---|---|---|---|
| 2002/0129140 | A1 | 9/2002 | Peled et al. |
| 2003/0194085 | A1* | 10/2003 | Dillaway ..................... 380/29 |
| 2008/0184367 | A1* | 7/2008 | McMillan et al. .............. 726/23 |
| 2009/0161876 | A1* | 6/2009 | Sherkin .......... 380/278 |
| 2010/0281223 | A1* | 11/2010 | Wolfe et al. ................... 711/133 |
| 2010/0281247 | A1 | 11/2010 | Wolfe et al. |
| 2010/0287383 | A1* | 11/2010 | Conte et al. .................. 713/189 |
| 2012/0159621 | A1* | 6/2012 | Jeong et al. .................... 726/22 |

FOREIGN PATENT DOCUMENTS

WO   WO 2014067413 A1 *   5/2014   .......... G06F 17/3089

OTHER PUBLICATIONS

Qiang Wang; Zhiguang Qin; "Stronger user authentication for web browser"; Advanced Computer Theory and Engineering (ICACTE); 2010 3rd International Conference on Year: Feb. 2010, vol. 5; pp. 539-543.*

(Continued)

*Primary Examiner* — Andrew Nalven
*Assistant Examiner* — Courtney Fields
(74) *Attorney, Agent, or Firm* — Ditthavong & Steiner, P.C.

(57) ABSTRACT

An approach is provided for enabling a web browser to decrypt and to display encrypted information based on entropy calculations of the information. The decryption manager determines at least one entropy value for at least one element of at least one webpage. The decryption manager causes, at least in part, a decryption of the at least one element to generate at least one decrypted element based, at least in part, on a comparison of the at least one entropy value against one or more entropy threshold values.

19 Claims, 9 Drawing Sheets

(56) References Cited

OTHER PUBLICATIONS

Notification of Transmittal of The International Search Report and The Written Opinion of The International Searching Authority, or The Declaration; International Search Report; Written Opinion for corresponding Application No. PCT/IB2013/058002, dated Feb. 12, 2014, pp. 1-14.

Khakpour et al., "High-Speed Flow Nature Indentification," Department of Computer Science and Engineering, Michigan State University, 29th IEEE International Conference on Distributed Computing Systems, published 2009, pp. 510-517.

Croft et al., "Language Modeling for Information Retrieval," Kluwer Academic Publishers, The Netherlands, published 2003, retrieved from web page http://books.google.fi/books?id=WTSOtP7XNr0C, pp. 148-150.

Teahan et al., "Using Compression-Based Language Models for Text Categorization," Language Modeling for Information Retrieval, published Jan. 2003, retrieved on Feb. 7, 2014 from web page http://boston.lti.cs.cmu.edu/callan/Workshops/lmir01/WorkshopProcs/Papers/teahan.pdf, 5 pages.

* cited by examiner

METHOD AND APPARATUS FOR DELIVERING ENCRYPTED CONTENT TO WEB BROWSERS BASED ON ENTROPY OF THE CONTENT

BACKGROUND

Service providers and device manufacturers (e.g., wireless, cellular, etc.) are continually challenged to deliver value and convenience to consumers by, for example, providing compelling network services. One area of interest has been the development of digital encryption techniques to safeguard the security and/or the privacy of data transmitted over the Internet (e.g., webpage content, online banking information, etc.). For example, when writing content for a webpage, a user may want to selectively hide through encryption certain sections of the webpage that are targeted at a specific audience (e.g., personal email accounts, home address information, etc.). Current encryption techniques often require implementation of browser-server key exchanges, security infrastructure (e.g., login, passwords, etc.), and/or embedding keys in the HyperText Markup Language (HTML), for example, to encrypt and/or to decrypt sensitive information. However, when a user only wants to encrypt a small amount of information (e.g., a personal email address), the current techniques may be excessive and, therefore, inefficient. Accordingly, service providers and device manufacturers face significant technical challenges in providing a service that locally encrypts and decrypts information in a webpage.

SOME EXAMPLE EMBODIMENTS

Therefore, there is a need for an approach for enabling a web browser to decrypt and to display encrypted information based on entropy calculations of the information.

According to one embodiment, a method comprises determining at least one entropy value for at least one element of at least one webpage. The method also comprises causing, at least in part, a decryption of the at least one element to generate at least one decrypted element based, at least in part, on a comparison of the at least one entropy value against one or more entropy threshold values.

According to another embodiment, an apparatus comprises at least one processor, and at least one memory including computer program code for one or more computer programs, the at least one memory and the computer program code configured to, with the at least one processor, cause, at least in part, the apparatus to determine at least one entropy value for at least one element of at least one webpage. The apparatus is also causes, at least in part, a decryption of the at least one element to generate at least one decrypted element based, at least in part, on a comparison of the at least one entropy value against one or more entropy threshold values.

According to another embodiment, a computer-readable storage medium carries one or more sequences of one or more instructions which, when executed by one or more processors, cause, at least in part, an apparatus to determine at least one entropy value for at least one element of at least one webpage. The apparatus is also causes, at least in part, a decryption of the at least one element to generate at least one decrypted element based, at least in part, on a comparison of the at least one entropy value against one or more entropy threshold values.

According to another embodiment, an apparatus comprises means for determining at least one entropy value for at least one element of at least one webpage. The apparatus also comprises means for causing, at least in part, a decryption of the at least one element to generate at least one decrypted element based, at least in part, on a comparison of the at least one entropy value against one or more entropy threshold values.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for enabling a web browser to decrypt and to display encrypted information based on entropy calculations of the information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
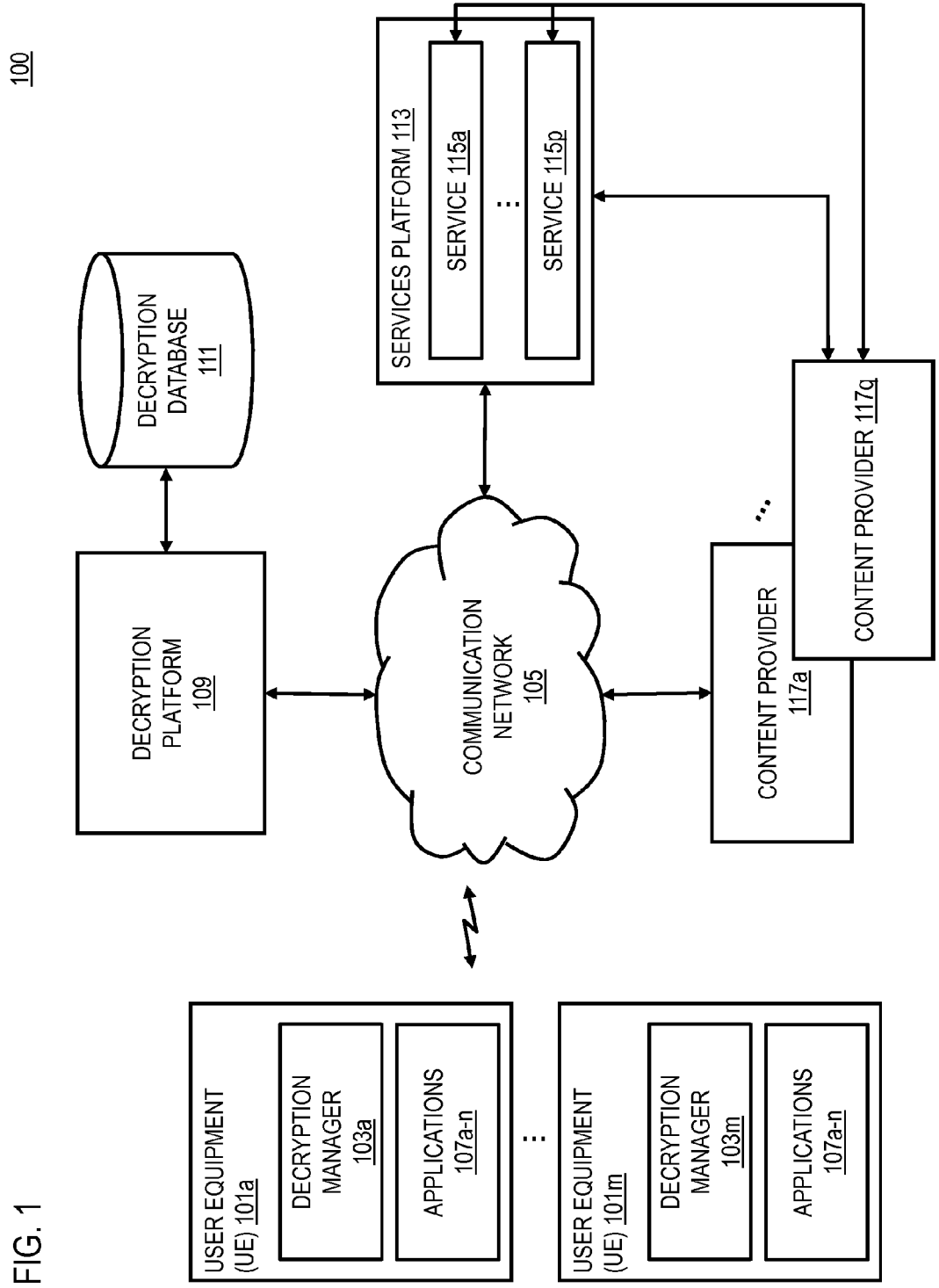
FIG. 1 is a diagram of a system capable of enabling a web browser to decrypt and to display encrypted information based on entropy calculations of the information, according to one embodiment.

FIG. 1 is a diagram of a system capable of enabling a web browser to decrypt and to display encrypted information based on entropy calculations of the information are disclosed, according to one embodiment. As previously discussed, one area of interest among service providers and device manufacturers has been the development of digital encryption techniques to safeguard the security and/or the privacy of data transmitted over the Internet (e.g., content of a personal webpage). By way of example, when writing content for a webpage, a user may want to selectively hide through encryption certain sections of the webpage that are targeted at a specific audience (e.g., a personal email address, home address information, etc.). Current encryption techniques often require implementation of browser-server key exchanges, security infrastructure (e.g., login, passwords, etc.), and/or embedding keys in an HTML document, for example, to encrypt and/or to decrypt sensitive information. However, when a user only wants to encrypt a small amount of information (e.g., a personal email address), the current techniques may be excessive and, therefore, inefficient.

To address this problem, a system 100 of FIG. 1 introduces the capability to enable a web browser to decrypt and to display encrypted information based on entropy calculations of the information. In particular, entropy is calculated with respect to a model. In one embodiment, the system 100 first determines the entropy model based, at least in part, on one or more languages (e.g., English (United States)+HTML) associated with at least one element of at least one webpage, the at least one webpage, or a combination thereof. By way of example, the system 100 can determine the language of the at least one webpage from the metadata associated with the webpage, the HTML <header> tag, the origin of the webpage, etc. Moreover, in one example use case, the least one webpage or HTML document may contain the at least one element within one or more HTML division tags (e.g., <div> and </div>), for example. Further, the one or more division tags may include, at least in part, at least one non-encrypted element (e.g., <div>Hello There</div>) and/or at least one encrypted element (e.g., <div>9834570238947590235089235089235792</div>).

In one or more embodiments, the system 100 next determines one or more entropy thresholds based, at least in part, on the one or more languages of the at least one webpage. More specifically, the system 100 can pre-compute either statically or dynamically the one or more entropy thresholds upon loading of the at least one webpage depending upon the detected language. Moreover, the system 100 may determine the one or more entropy thresholds on a per element basis or on a per webpage basis. In addition, as HTML elements are composable, a matrix or other suitable structure of entropies may be determined by the system 100 for determining the one or more entropy thresholds. Further, in one embodiment, if the system 100 determines that at least one entropy value of the at least one element is above the one or more entropy thresholds, then the system 100 may consider the at least one element sufficiently random and likely encrypted. Thereafter, the system 100 can determine whether or not to cause, at least in part, a display of the at least one element or attempt to guess the content through decryption, for example.

By way of example, the system 100 can determine that the one or more entropy threshold values fall on a scale of 0 to 1. In one example use case, if the system 100 determines that the at least one entropy value for the at least one element is 0.7, for example, then the system 100 may determine that the at least one element consists of English (US) text (e.g., "Hello There") that can be displayed by the system 100 without requiring decryption. If the system 100, however, determines that the at least one entropy value for the at least one element is between 0.7 and 0.9, for example, then the system 100 may determine that the at least one element is not random enough to be encrypted, but it also does not consist of English (US) text. Consequently, the system 100 may attempt to translate the at least one element using a translation engine, for example. Further, if the system 100 determines that the at least one entropy value is 0.9 to 1, for example, then the system 100 may determine that the at least one element (e.g., "9834570238947590235089235089235792") is encrypted.

In one embodiment, the system 100 then processes and/or facilitates a processing of the at least one element to determine one or more decryption parameters, one or more entropy calculation parameters, or a combination thereof, wherein the determining of the at least one entropy value, the decryption of the at least one element, or a combination thereof is based, at least in part, on the one or more decryption parameters, the one or more entropy calculation parameters, or a combination thereof. More specifically, the one or more decryption parameters include, at least in part, one or more certificates, one or more keys, or a combination thereof associated with an application presenting the at least one element, the at least one webpage, or a combination thereof (e.g., a web browser or suitable mechanism for browsing the Internet). Moreover, in certain embodiments, the system 100 may have access to one or more additional certificates, one or more additional keys, or a combination thereof stored locally in one or more databases. In addition, in one or more embodiments, the one or more certificates, the one or more keys, or a combination thereof may be related to one or more portions of the at least one webpage, the at least one element, or a combination thereof. For example, the one or more certificates (e.g., provided by one or more third-party certification authorities) might apply to <html> or <body> elements of the at least one webpage, while one or more keys may apply to the at least one element within the division sections of the at least one webpage. Further, in one embodiment, the system 100 may determine one or more parameters associated with the at least one element (e.g., <div crypt=x> Dsfgkkdfjkgg</dev>). Based on the one or more parameters (e.g., "crypt=x"), the system 100 can filter the available one or more keys and reduce the amount of attempted decryptions required by the system 100 and/or the time to determine that the at least one element is automatically displayable (e.g., "Hello There").

In certain embodiments, the system 100 additionally processes and/or facilitates a processing of the at least one element via one or more syntactic analyses, one or more semantic analyses, or a combination thereof to determine the one or more decryption parameters, the one or more entropy calculation parameters, or a combination thereof. As previously discussed, the system 100 can determine the language (e.g., English (US)) based, at least in part, on the metadata associated with the webpage, for example. The system 100 can then tailor the one or more syntactic analyses, the one or more semantic analyses, or a combination thereof based, at least in part, on the determined language. For example, if the system 100 determines that the language of the at least one webpage is English (US), then the system 100 can determine that the at least one element consisting of ten numbers (e.g., "2125551212") likely represents a telephone number within the United States and not a random number requiring decryption.

In one embodiment, the system 100 then determines the at least one entropy value for the at least one element. More specifically, the determining of the at least one entropy value, the decryption of the at least one element, or a combination thereof is performed by an application presenting the at least one element, the at least one webpage, or a combination thereof (e.g. a web browser). As previously discussed, the at least one entropy value is based, at least in part, on the determination by the system 100 of the randomness of the at least one element with respect to the previously determined entropy model. By way of example, in the example use case discussed above, if the system 100 determines that the first division section (e.g., <div>Hello There</div>) has an entropy value below the one or more entropy threshold values (e.g., 0.65), then the system 100 can cause, at least in part, the application presenting the at least one element (e.g., a web browser) to render the at least one element. In contrast, if the system 100 determines that the second division section (e.g., <div>98345702389475902350892350892235792</div>) has an entropy value above the one or more threshold values (e.g., 0.95), then the system 100 causes, at least in part, a decryption of the at least one element to generate at least one decrypted element. More specifically, the system 100 can attempt to decrypt the at least one element in series, in parallel, or in a distributed manner, for example, based, at least in part, on the one or more certificates, the one or more keys, or a combination thereof.

In certain embodiments, the system 100 next determines at least another entropy value for the at least one decrypted element (e.g., the at least another entropy value for the at least one decrypted element previously determined by the system 100 from the at least one encrypted element "98345702389475902350892350892235792"). In particular, the system 100 determines the at least another entropy value using the same process for determining the at least one entropy value, except in this instance, the system 100 is attempting to determine whether the at least another entropy value has now decreased relative to the at least one entropy value (i.e., the encrypted text has now become less random as a result of the decryption).

In one embodiment, the system 100 then determines whether the at least one entropy value, the at least another entropy value, or a combination thereof do not at least substantially meet the one or more entropy thresholds. As previously discussed, when the system 100 determines that the at least one entropy value does not at least substantially meet the one or more entropy thresholds (e.g., 0.65), the system 100 can cause, at least in part, the application presenting the at least one element (e.g., a web browser) to render the at least one element. In contrast, when the system 100 determines that the at least another entropy value does not substantially meet the one or more entropy thresholds (e.g., the at least another entropy value has not sufficiently decreased), the system 100 may determine to cause, at least in part, a further decryption of the at least one decrypted element or determine a failed completion of the decryption.

In one embodiment, if the system 100 determines that the another entropy value has not sufficiently decreased, then the system 100 can cause, at least in part, a further decryption of the at least one decrypted element to generate at least one further decrypted element based, at least in part, on a comparison of the at least another entropy value against the one or more entropy threshold values (e.g., 0.9-1). As previously discussed, the system 100 includes or has access to one or more certificates, one or more keys, or a combination thereof. Consequently, the system 100 can attempt to decrypt the at least one decrypted element using the one or more certificates, the one or more keys, or a combination thereof not previously used by the system 100 to cause, at least in part, the further decryption of the at least one element.

In certain embodiments, the system 100 can cause, at least in part, a recursive decryption of the at least one element, the at least one decrypted element, or a combination thereof based, at least in part, on the one or more entropy threshold values. For example, the system 100 can attempt to decrypt the at least one element, the at least one decrypted element, or a combination thereof using the one or more keys in successive order (e.g., Key 1, Key 2, Key 3, etc.) until the system 100 determines a successful completion (e.g., "Here is the decrypted message") or the system 100 determines the failed completion of the decryption of the at least one element. More specifically, a failed completion is determined by the system 100 when the another entropy value for the at least one decrypted element fails to decrease upon further decryption attempts (e.g., the recursive decryption).

In one or more embodiments, based on the results of the at least another entropy value, the system 100 determines whether to cause, at least in part, a rendering of the at least one element based, at least in part, on a successful completion (e.g., "Here is the decrypted message") or a failed completion of the decryption of the at least one element, wherein the successful completion or the failed completion is based, at least in part, on a comparison of the at least another entropy value associated with the at least one decrypted element against the one or more entropy threshold values (e.g., 0.9-1). As previously discussed, a successful completion is determined by the system 100 when the another entropy value for the at least one decrypted element decreases relative to the at least one entropy value (i.e., the encrypted text becomes sufficiently less random). For example, if the system 100 determines that the another entropy value is now below the one or more entropy threshold values (e.g., 0.65), then the system 100 can cause, at least in part, a display of the result of the decryption (e.g., "Here is the decrypted message") and the system 100 will not make any further decryption attempts. Alternatively, a failed completion is determined by the system 100 when the another entropy value for the at least one decrypted element fails to decrease upon further decryption attempts. If all attempts by the system 100 fail, then the system 100 can determine not to display the at least one element.

In one or more embodiments, if the system 100 determines the failed completion of the decryption of the at least one element (e.g., the another entropy value fails to lower), then the system 100 can cause, at least in part, a presentation of one or more hints, one or more requests for decryption information, summary information, or a combination thereof associated with the at least one element. For example, the system 100 can cause, at least in part, the application presenting the at least one element (e.g., a web browser) to display a hint about the content of the encrypted information (e.g., "Hidden Content—click here") or trigger one or more further processes with one or more user supplied decryption keys or a change in the one or more entropy threshold values. Moreover, the system 100 might store this information in the application or in a cookie form for future reference. As a result, no information about the at least one element needs to be passed to the system 100 in the at least one webpage or HTML document to decrypt and to display encrypted information embedded in the at least one webpage.

As shown in FIG. 1, the system 100 comprises one or more user equipment (UE) 101a-101m (e.g., mobile phones, tablets, personal computers, etc.) (also collectively referred to as UEs 101) having connectivity to a decryption platform 103 via a communication network 105. The UEs 101 include or have access to one or more decryption managers 107a-107m (also collectively referred to as decryption managers 107). While it is contemplated that the decryption platform 103 and the decryption managers 107 are interchangeable, the various embodiments of the present invention disclosed herein mainly reference the decryption managers 107 for the sake of explanation. The UEs 101 also include or have access to one or more applications 109a-109m (also collectively referred to as applications 109). By way of example, the applications 109 may include a web browser, a translation application, a GNU Privacy Guard (GPG) cryptographic application, media applications, social networking applications, etc. In one embodiment, a decryption manager 107 may exist in whole or in part within an application 107 (e.g., a web browser), or independently.

In one embodiment, the decryption platform 103/decryption managers 107 may include or be associated with at least one decryption database 111. In one example embodiment, the decryption platform 103 may exist in whole or in part within the UEs 101, or independently, and the decryption database 111 may exist in whole or in part within the decryption platform 103, or independently. The decryption database 111 may include one or more decryption parameters, one or more entropy calculation parameters, or a combination thereof, wherein the one or more decryption parameters include, at least in part, the one or more certificates, the one or more keys, or a combination thereof associated with the decryption manager 107, the applications 109 (e.g., a web browser), or a combination thereof. The decryption database 111 may also include one or more additional certificates, one or more additional keys, or a combination thereof as well as one or more generic hints (e.g., "Hidden content—click here"), one or more generic requests for decryption information, one or more cookies, or a combination thereof associated with the at least one element.

The UEs 101 are also connected to a services platform 113 via the communication network 105. The services platform 113 includes one or more services 115a-115p (also collectively referred to as services 115). The services 115 may include a wide variety of content provisioning services for the decryption managers 107 and the applications 109. By of example, the services 115 may include certificate authority services, Internet hosting services, syntactic or semantic check services, social networking services, etc. The UEs 101, the services platform 113 and the services 115 also have connectivity to one or more content providers 117a-117q (also collectively referred to as content providers 117). The content providers 117 also may provision a wide variety of content (e.g., one or more certificates, one or more keys, etc.) to the components of the system 100.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

In one embodiment, the decryption platform 103/the decryption managers 107 first determines the entropy model based, at least in part, on one or more languages associated with at least one element of at least one webpage, the at least one webpage (e.g., a personal homepage), or a combination thereof. As previously discussed, the at least one webpage or HTML document hosted on a webserver (e.g., the decryption platform 103) may contain one or more HTML division tags, for example. In particular, within the one or more division tags (e.g., <div> and </div>), a user can insert non-encrypted and/or encrypted content. For example, the one or more division tags may include, at least in part, at least one non-encrypted element (e.g., <div>Hello There</div>) and/or at least one encrypted element (e.g., <div>98345702389475902350892350892357892</div>). Again, while the decryption platform 103 and the decryption managers 107 are interchangeable, the various embodiments of the present invention disclosed herein mainly reference the decryption manager 107 for the sake of explanation.

In one or more embodiments, the decryption manager 107 next determines one or more entropy thresholds based, at least in part, on the one or more languages of the at least one webpage (e.g., English (US)). In particular, the decryption manager 107 can pre-compute either statically or dynamically the one or more entropy thresholds upon loading of the at least one webpage depending upon the detected language. By way of example, the decryption manager can determine that one or more entropy threshold values fall on a scale of 0 to 1. As previously discussed, if the decryption manager 107 determines that the at least one entropy value for the at least one element is 0.7, for example, then the decryption manager 107 may determine that the at least one element consists of English (US) text (e.g., "Hello There") that can be displayed by the decryption manager 107, an application 109 (e.g., a web browser), or a combination thereof without requiring decryption. If the decryption manager 107, however, determines that the at least one entropy value for the at least one element is between 0.7 and 0.9, for example, then the decryption manager 107 may determine that the at least one element is not random enough to be encrypted, but also does not consist of English (US) text. Consequently, the decryption manager 107 may attempt to translate the at least one element using an application (e.g., a translation engine), for example. Further, if the decryption manager 107 determines that the at least one entropy value is 0.9 to 1, for example, then the decryption manager 107 may determine that the at least one element (e.g., "98345702389475902350892350892357892") is encrypted.

In one or more embodiments, the decryption manager 107 then processes and/or facilitates a processing of the at least one element to determine one or more decryption parameters, one or more entropy calculation parameters, or a combination thereof, wherein the determining of the at least one entropy value, the decryption of the at least one element, or a combination thereof is based, at least in part, on the one or more decryption parameters, the one or more entropy calculation parameters, or a combination thereof. In particular, the one or more decryption parameters include, at least in part, one or more certificates, one or more keys, or a combination thereof associated with the decryption manager 107, the applications 109 (e.g., a web browser), or a combination thereof presenting the at least one element, the at least one webpage, or a combination thereof. In addition, in one embodiment, the decryption manager 107 may determine one or more parameters associated with the at least one element (e.g., <div crypt=x>Dsfgkkdfjkgg</dev>). Based on the one or more parameters (e.g., "crypt=x), the decryption manager 107 can filter the one or more available keys and reduce the amount of attempted decryptions required by the decryption manager 107 and/or the time to determine that the at least one element is automatically displayable (e.g., "Hello There").

In certain embodiments, the decryption manager 107 additionally processes and/or facilitates a processing of the at least one element via one or more syntactic analyses, one or more semantic analyses, or a combination thereof. For example, the decryption manager 107 can determine the language of the at least one webpage (e.g., English (US)) based, at least in part, on metadata associated with the webpage. The decryption manager 107 can then tailor the one or more syntactic analyses, the one or more semantic analyses, or a combination thereof based, at least in part, on the determined language.

In one embodiment, the decryption manager 107 then determines the at least one entropy value for the at least one element. More specifically, the determining of the at least one entropy value, the decryption of the at least one element, or a combination thereof is performed by the decryption manager 107, an application 109 (e.g., a web browser), or a combination thereof presenting the at least one element, the at least one webpage, or a combination thereof. In certain embodiments, the decryption manager 107 next determines at least another entropy value for the at least one decrypted element (e.g., the at least one decrypted element determined from the at least one encrypted element "98345702389475902350892350892357892"). In particular, the decryption manager 107 determines the at least another entropy value using the same process for determining the at least one entropy value, except in this instance, the encryption manager 107 is attempting to determine whether the at least another entropy value has now decreased relative to the at least one entropy value (i.e., the encrypted text has become less random as a result of the decryption).

In one embodiment, the decryption manager 107 then determines whether the at least one entropy value, the at least another entropy value, or a combination thereof do not at least substantially meet the one or more entropy thresholds. As previously discussed, when the decryption manager 107 determines that the at least one entropy value does not at least substantially meet the one or more entropy thresholds (e.g., 0.65), the decryption manager 107 can cause, at least in part, an application 109 (e.g., a web browser) to render the at least one element. In contrast, when the decryption manager 107 determines that the at least another entropy value does not substantially meet the one or more entropy thresholds (e.g., the at least another entropy value has not sufficiently decreased), the decryption manager 107 may determine to cause, at least in part, a further decryption of the at least one decrypted element or determine a failed completion of the decryption (e.g., after one or more recursive attempts).

In one embodiment, if decryption manager 107 determines that the another entropy value has not sufficiently decreased, the decryption manager 107 can cause, at least in part, a further decryption of the at least one decrypted element to generate at least one further decrypted element based, at least in part, on a comparison of the at least another entropy value against the one or more entropy threshold values (e.g., 0.7 to 0.9). As previously discussed, the decryption manager 107 includes or has access to one or more certificates, one or more keys, or a combination thereof. Consequently, the decryption manager 107 can attempt to decrypt the at least one decrypted element using the one or more certificates, the one or more keys, or a combination thereof not previously used by the decryption manager 107 to cause, at least in part, the further decryption of the at least one element.

In certain embodiments, the decryption manager 107 also causes, at least in part, a recursive decryption of the at least one element, the at least one further decrypted element, or a combination thereof based, at least in part, on the one or more entropy threshold values. By way of example, the decryption manager 107 can attempt to decrypt the at least one element, the at least one decrypted element, or a combination thereof using the one or more keys in successive order until the decryption manager 107 determines a successful completion (e.g., "Here is the decrypted message") or a failed completion of the decryption of the at least one element. In particular, a failed completion is determined by the decryption manager 107 when the another entropy value for the at least one decrypted element fails to decrease upon further decryption attempts (e.g., the recursive decryption).

In one or more embodiments, based on the results of the at least another entropy value, the decryption manager 107 determines whether to cause, at least in part, a rendering of the at least one element based, at least in part, on a successful completion (e.g., "Here is the decrypted message") or a failed completion of the decryption of the at least one element, wherein the successful completion or the failed completion is based, at least in part, on a comparison of the at least another entropy value associated with the at least one decrypted element against the one or more entropy threshold values. As previously discussed, a successful completion is determined by the decryption manager 107 when the another entropy value of the at least one element decreases relative to the at least one entropy value (i.e., the encrypted text becomes sufficiently less random). Moreover, if the decryption manager 107 determines that the another entropy value is now below the one or more entropy threshold values, the decryption manager 107 can cause, at least in part, a display of the result of the decryption (e.g., "Here is the decrypted message") and the decryption manager 107 will not make any further decryption attempts. In one or more embodiments, if the decryption manager 107 determines the failed completion of the decryption of the at least one element (e.g., the another entropy value fails to lower), then the decryption manager 107 can cause, at least in part, a presentation of one or more hints, one or more requests for decryption information, summary information, or a combination thereof associated with the at least one element.

By way of example, the UEs 101, decryption platform 103/decryption managers 107, the services platform 113, the content provider 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
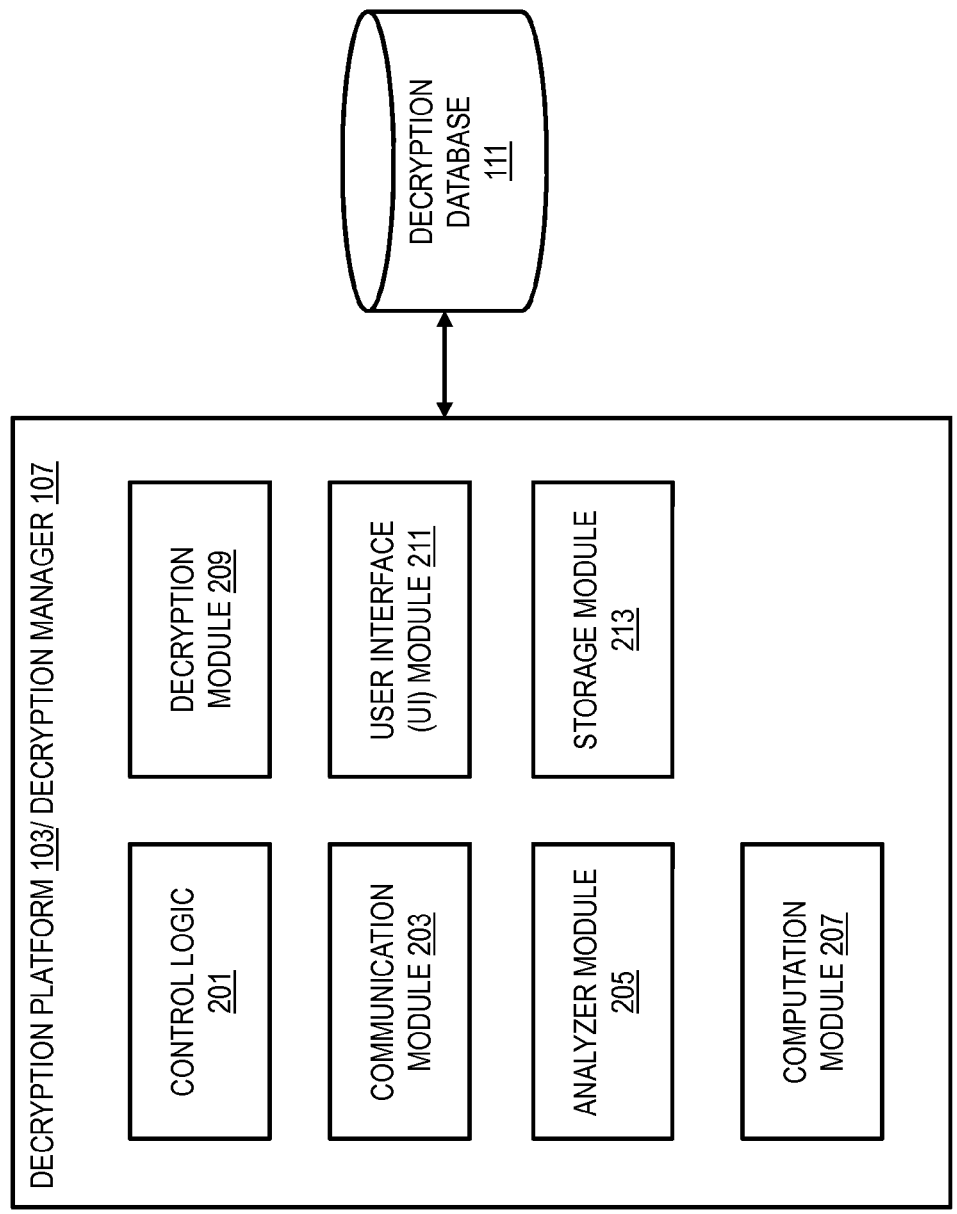
FIG. 2 is a diagram of the components of a decryption platform/decryption manager, according to one embodiment.

FIG. 2 is a diagram of the components of decryption platform 103/decryption manager 107, according to one embodiment. As previously discussed, while the decryption platform 103 and the decryption manager 107 are interchangeable, the various embodiments of the present invention disclosed herein mainly reference the decryption manager 107 for the sake of explanation. By way of example, the decryption manager 107 includes one or more components for providing enabling a web browser to decrypt and to display encrypted information based on entropy calculations of the information. It is contemplated that the functions of these components may be combined in one or more components or performed by other components of equivalent functionality. In this embodiment, the decryption manager 107 includes a control logic 201, a communication module 203, an analyzer module 205, a computation module 207, a decryption module 209, a user interface (UI) module 211, and a storage module 213.

The control logic 201 oversees tasks, including tasks performed by the communication module 203, the analyzer module 205, the computation module 207, the decryption module 209, the user interface (UI) module 211, and the storage module 213. For example, although the other modules may perform the actual task, the control logic 201 may determine when and how those tasks are performed or otherwise direct the other modules to perform the task. The control logic 201, in connection with the decryption module 209, may also be used to cause, at least in part, a recursive decryption of the at least one element (e.g., ("9834570238947590235089235089235792"), the at least one decrypted element, or a combination thereof based, at least in part, on the one or more entropy thresholds.

The communication module 203 is used for communication between the UEs 101, the decryption platform 103, the decryption managers 107, the applications 109, the decryption database 111, the services platform 113, the services 115, and the content providers 117. The communication module 203 may also be used to communicate commands, requests, data, etc. The communication module 203 also may be used to process and/or facilitate a processing of the at least one element via one or more syntactic analyses, one or more semantic analyses, or a combination thereof to determine the one or more decryption parameters, the one or more entropy calculation parameters, or a combination thereof.

The analyzer module 205 is used for determining one or more languages associated with the at least one element, the at least one webpage, or a combination thereof (e.g., English (US)). As previously discussed, entropy is calculated with respect to a model and in one example use case, the analyzer module 205 can determine the model based on determining the one or more languages of the at least one webpage. The analyzer module 205 may also be used to process and/or facilitate a processing of the at least one element (e.g., "9834570238947590235089235089235792") to determine one or more decryption parameters, one or more entropy calculation parameters, or a combination thereof, wherein the one or more decryption parameters include, at least in part, one or more certificates, one or more keys, or a combination thereof associated with an application presenting the at least one element, the at least one webpage, or a combination thereof (e.g., a web browser). The analyzer module 205 also may be used to determine whether the at least one entropy value, the at least another entropy value, or a combination thereof do not at least substantially meet the one or more entropy thresholds (e.g., 0.9-1). The analyzer module 205, in connection with the UI module 211, may also be used to determine whether to cause, at least in part, a rendering of the at least one element based, at least in part, on a successful completion (e.g., "Here is the decrypted message") or a failed completion of the decryption of the at least one element. Further, the analyzer module 205 also may be used to determine the failed completion of the decryption of the at least one element (e.g., the another entropy value fails to lower).

In one embodiment, the computation module 207 is used to determine the one or more entropy thresholds based, at least in part, on the one or more languages. By way of example, the computation module 207 may determine based on a determination of the language of the at least one webpage (e.g., English (US)) that if the entropy value is below 0.7, then the at least one element consists of English text (e.g., "Hello There"); if the entropy value is 0.7 to 0.9, then the at least one element is not random enough to be encrypted, but also does not consist of English text; and if the entropy value is between 0.9 and 1, then the at least one element (e.g., "98345702389475902350892350892357792") is sufficiently random and likely encrypted. The computation module 207 may also be used to determine at least one entropy value for at least one element of at least one webpage. As previously discussed, entropy is determined with respect to a model and the at least one entropy value determined by the computation module 207 is a measure of the randomness of the at least one element compared against the entropy model. By way of example, the entropy value of the at least one element "Hello There" may be relatively low whereas the entropy of the at least one element "98345702389475902350892350892357792" may be relatively high. Further, the computation module 207 also may be used to determine at least another entropy value for the at least one decrypted element. More specifically, given the results of the decryption of the at least one element by the decryption module 209, the computation module 207 determines a second entropy value for the at least one decrypted element to determine whether the at least another entropy value has decreased relative to the at least one entropy value (i.e., the encrypted text becomes less random).

The decryption module 209 is used to cause, at least in part, a decryption of the at least one element to generate at least one decrypted element based, at least in part, on a comparison of the at least one entropy value against one or more entropy threshold values. In particular, the decryption module 209 can attempt to decrypt the at least one element (e.g., "98345702389475902350892350892357792") in series, in parallel, or in a distributed manner, for example, based, at least in part, on the one or more certificates, the one or more keys, or a combination thereof. As previously discussed, the decryption manager 107 includes ones or more certificates, one or more keys, or a combination thereof and may have access to one or more additional certificates, one or more additional keys, or a combination thereof stored within the decryption database 111, for example. The decryption module 209 may also be used to cause, at least in part, a further decryption of the at least one decrypted element to generate at least one further decrypted element based, at least in part, on a comparison of the at least one another entropy value against the one or more entropy threshold values. By way of example, the decryption module 209 may cause, at least in part, a decryption of the at least one element (e.g., "98345702389475902350892350892357792"). The computation module 207 can then determine at least another entropy value for the at least one decrypted element. Based, at least in part, on the result of the at least another entropy value, the decryption module 209 can further decrypt the at least one decrypted element using the one or more certificates, the one or more keys, or a combination thereof not previously used by the decryption module 209 to cause, at least in part, the decryption of the at least one element in an effort to reduce the at least another entropy value (i.e., reduce the randomness of the at least one element). As previously discussed, the decryption module 209, in connection with the control logic 201, can cause, at least in part, a recursive decryption of the at least one element, the at least one decrypted element, or a combination thereof based, at least in part, on the one or more entropy threshold values. For example, the decryption module 209 can attempt to decrypt the at least one element using the one or more keys in successive order (e.g., Key 1, Key 2, Key 3, etc.).

In one embodiment, the user interface (UI) module 211 is used, in connection with the analyzer module 205, to determine whether to cause, at least in part, a rendering of the at least one element based, at least in part, on a successful completion (e.g., "Here is the decrypted message") or a failed completion of the decryption of the at least one element. The UI module 211 may also be used to cause, at least in part, a presentation of one or more hints, one or more requests for decryption information, summary information, or a combination thereof associated with the at least one element. For example, in one example use case, the UI module 211 can display a hint about the content of the encrypted information (e.g., "Hidden Content—click here").

The storage module 213 is used to manage the storage of the one or more decryption parameters, the one or more entropy calculation parameters, or a combination thereof stored in the decryption database 111, wherein the one or more decryption parameters include, at least in part, one or more certificates, one or more keys, or a combination thereof associated with the decryption managers 107, the applications 109 (e.g., the web browser), or a combination thereof. The storage module 213 may also be used to manage the storage of the one or more additional certificates, the one or more additional keys, or a combination thereof as well as one or more generic hints (e.g., "Hidden content—click here"), one or more generic requests for decryption information, one or more cookies, or a combination thereof also stored in the decryption database 111.

Figure 3:
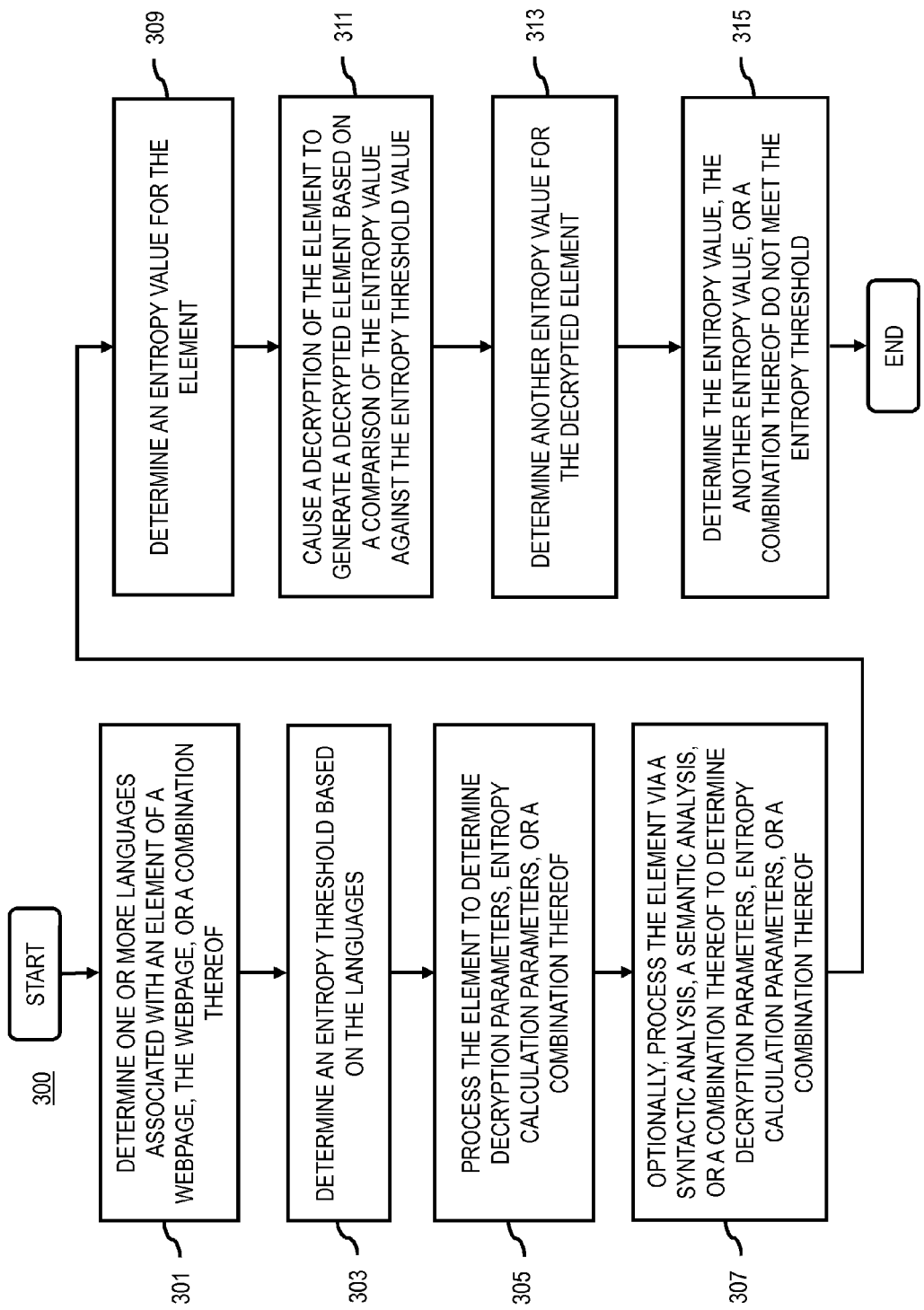
FIGS. 3 and 4 are flowcharts of processes for enabling a web browser to decrypt and to display encrypted information based on entropy calculations of the information, according to one embodiment.
Figure 4:
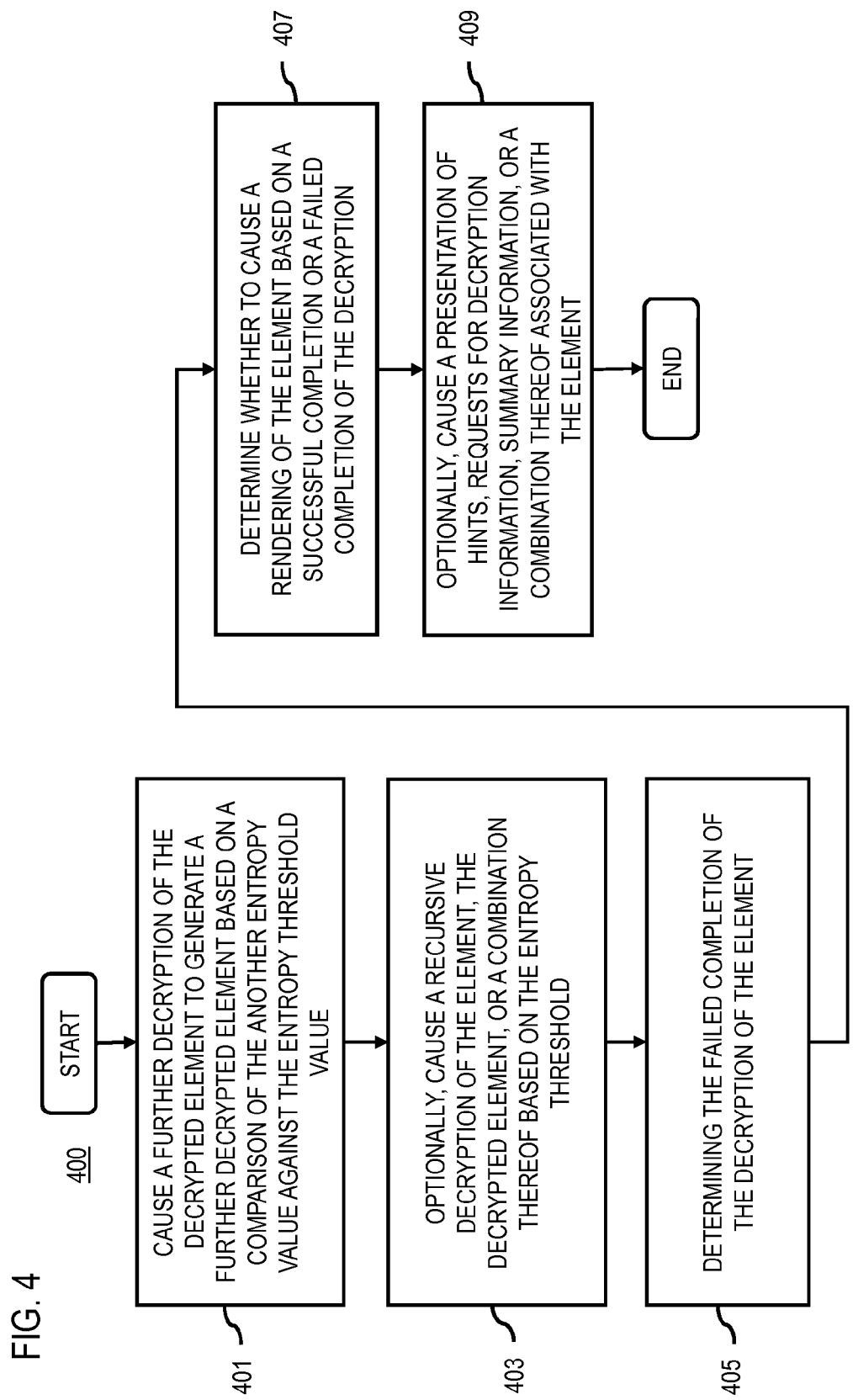
Figure 8:
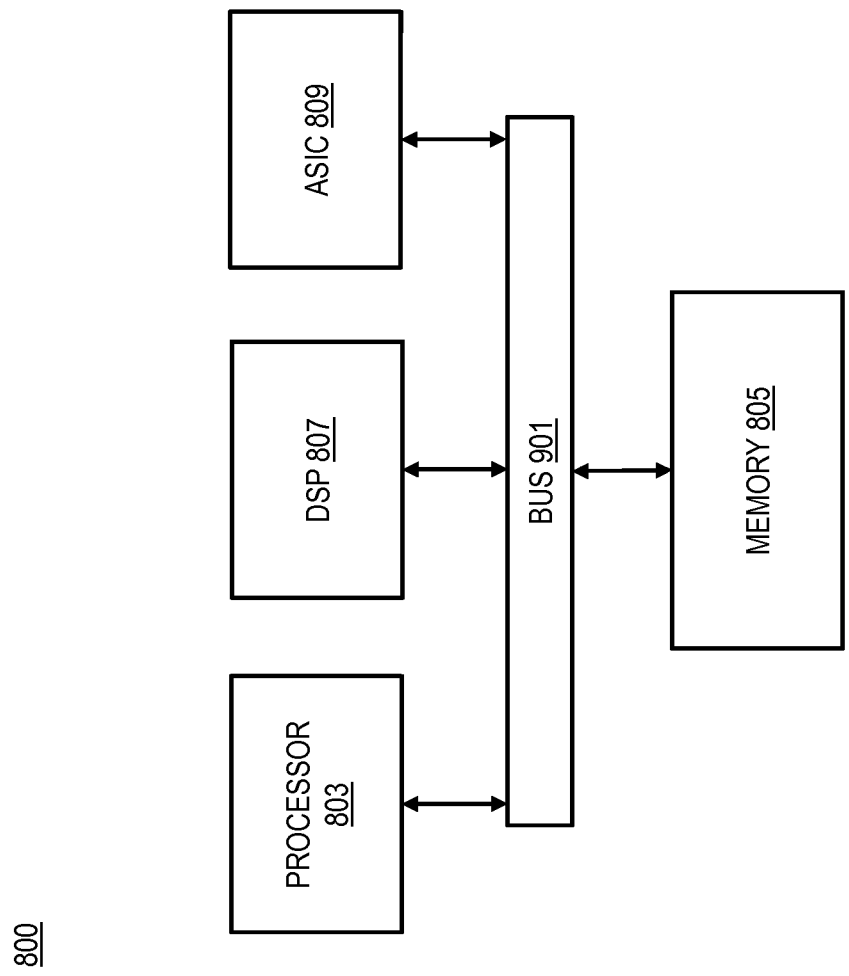
FIG. 8 is a diagram of a chip set that can be used to implement an embodiment of the invention.

FIGS. 3 and 4 are flowcharts of processes for enabling a web browser to decrypt and to display encrypted information based on entropy calculations of the information, according to one embodiment. FIG. 3 depicts a process 300 of determining entropy values associated with at least one element. In one embodiment, the decryption platform 103/decryption manager 107 performs the process 300 and is implemented in, for instance, a chip set including a processor and a memory as shown in FIG. 8. In step 301, the decryption manager 107 determines one or more languages associated with the at least one element, the at least one webpage, or a combination thereof. As previously discussed, entropy is calculated with respect to a model. In one example use case, the entropy model is determined by the decryption manager 107 by determining the language of the at least one webpage (e.g., English (US)+HTML). More specifically, the decryption manager 107 can determine the language of the at least one webpage, based, at least in part, on metadata associated with the webpage, the HTML <header> tag, the origin of the webpage, etc. Further, in one example use case, the at least one webpage or HTML document may contain the at least one element within one or more HTML division tags (e.g., <div> and </div>), for example. In particular, the one or more division tags may include, at least in part, at least one non-encrypted element (e.g., <div>Hello There</div>)

and/or at least one encrypted element (e.g., <div>983457023894759023508923508923579</div>).

In step 303, the decryption manager 107 determines the one or more entropy thresholds based, at least in part, on the one or more languages. As previously discussed, the decryption manager 107 can pre-compute either statically or dynamically the one or more entropy thresholds upon loading of the at least one webpage depending upon the detected language. Moreover, the decryption manager 107 may determine the one or more entropy thresholds on a per element based or a per webpage basis. In addition, as HTML elements are composable, a matrix or other suitable structure of entropies may be determined by the decryption manager 107 for determining the one or more entropy thresholds. Further, in one embodiment, if the decryption manager 107 determines that at least one entropy value of the at least one element is above the one or more entropy thresholds, then the decryption manager 107 may consider the at least one element sufficiently random and likely encrypted. Thereafter, the decryption manager 107 can determine whether or not to cause, at least in part, a display of the at least one element or attempt to guess the content through encryption, for example.

By way of example, the decryption manager 107 can determine that the one or more entropy threshold values fall on a scale of 0 to 1. In one example use case, if the decryption manager determines that the at least one entropy value for the at least one element is 0.7, for example, than the decryption manager 107 may determine that the at least one element consists of English text (e.g., "Hello There") and can be displayed by the decryption managers 107, the applications 109, or a combination thereof without requiring decryption. If the decryption manager 107, however, determines that the at least one entropy value for the at least one element is between 0.7 and 0.9, for example, then the decryption manager 107 may determine that the at least one element is not random enough to be encrypted, but it also does not consist of English (US) text. Consequently, the decryption manager 107 may attempt to translate the at least one element using a translation engine, for example. Further, if the decryption manager 107 determines that the at least one entropy value is 0.9 to 1, for example, then the system 100 may determine that the at least one element (e.g., "983457023894759023508923508923579") is encrypted.

In step 305, the decryption manager 107 processes and/or facilitates a processing of the at least one element to determine one or more decryption parameters, one or more entropy calculation parameters, or a combination thereof, wherein the determining of the at least one entropy value, the decryption of the at least one element, or a combination thereof is based, at least in part, on the one or more decryption parameters, the one or more entropy calculation parameters, or a combination thereof. In particular, the one or more decryption parameters include, at least in part, one or more certificates, one or more keys, or a combination thereof associated with an application presenting the at least one element, the at least one webpage, or a combination thereof (e.g., a web browser). Moreover, in certain embodiments, the decryption manager 107 may also have access to one or more additional certificates, one or more additional keys, or a combination thereof stored locally in the one or more databases (e.g., the decryption database 111). In addition, in one or more embodiments, the one or more certificates, the one or more keys, or a combination thereof may be related to one or more portions of the at least one webpage, the at least one element, or a combination thereof. For example, the one or more certificates (e.g., provided by one or more third-party certification authorities) might apply to <html> or <body> elements of the at least one webpage, while one or more keys may apply to the at least one element within the HTML division sections of the at least one webpage. Further, in one embodiment, the decryption manager 107 may determine one or more parameters associated with the at least element (e.g., <div crypt=x>Dsfgkkdfjkgg</dev>). Based on the one or more parameters (e.g., "crypt=x"), the decryption manager 107 can filter the one or more available keys and reduce the amount of attempted decryptions required by the decryption manager 107 and/or the time to determine that the at least one element is automatically displayable (e.g., "Hello There").

In step 307, the decryption manager 107 optionally processes and/or facilitates a processing of the at least one element via one or more syntactic analyses, one or more semantic analyses, or a combination thereof to determine the one or more decryption parameters, the one or more entropy calculation parameters, or a combination thereof. As previously discussed, the decryption manager 107 can determine the language of the at least one webpage (e.g., English (US)) based, at least in part, on metadata associated with the webpage, for example. The decryption manager 107 can then tailor the one or more syntactic analyses, the one or more semantic analyses, or a combination thereof performed locally and/or via one or more services 115 based, at least in part, on the determined language. By way of example, if the decryption manager 107 determines that the language of the at least one webpage is English (US), then the decryption manager 107 can determine that the at least one element consisting of ten numbers (e.g., "2125551212") likely represents a telephone number within the United States and not a random number requiring decryption.

In step 309, the decryption manager 107 determines at least one entropy value for at least one element of at least one webpage. More specifically, the determining of the at least one entropy value, the decryption of the at least one element, or a combination thereof is performed by an application presenting the at least one element, the at least one webpage, or a combination thereof (e.g., a web browser or a mechanism suitable for browsing the Internet). As previously discussed, the at least one entropy value is based, at least in part, on the randomness of the at least one element with respect to the previously determined entropy model. By way of example, in the example use case discussed above, the decryption manager 107 may determine that the first division section (e.g., <div>Hello There</div>) has an entropy value below the one or more entropy threshold values (e.g., 0.65) and, therefore, can cause, at least in part, the application presenting the at least one element (e.g., a web browser) to render the at least one element.

In step 311, the decryption manager 107 causes, at least in part, a decryption of the at least one element to generate at least one decrypted element based, at least in part, on a comparison of the at least one entropy value against one or more entropy threshold values. By way of example, the decryption manager 107 may determine that the second division section (e.g., <div>983457023894759023508923508923579</div>) has an entropy value above the one or more threshold values (e.g., 0.95) and, therefore, can cause, at least in part, a decryption of the at least one element to generate at least one decrypted element. More specifically, the decryption manager 107 can attempt to decrypt the at least one element in series, in parallel, or in a distributed manner, for example, based, at least in part, on the one or more certificates, the one or more keys, or a combination thereof.

In step 313, the decryption manager 107 determines at least another entropy value for the at least one decrypted element. For example, the decryption manager 107 may determine the at least another entropy value for the at least one decrypted element previously determined by the decryption manager 107 from the at least one encrypted element (e.g., "9834570238947590235089235089235792"). More specifically, the decryption manager 107 determines the at least another entropy value using the same process for determining the at least one entropy value, except in this instance, the decryption manager 107 is attempting to determine whether the at least another entropy value has now decreased relative to the at least one entropy value (i.e., the encrypted text has become sufficiently less random as a result of the decryption).

In step 315, the decryption manager 107 determines the at least one entropy value, the at least another entropy value, or a combination thereof do not at least substantially meet the one or more entropy thresholds. By way of example, when the decryption manager 107 determines that the at least one entropy value does not at least substantially meet the one or more entropy thresholds (e.g., the at least one entropy value for the at least one element "Hello There"), the decryption manager 107 can cause, at least in part, the application presenting the at least one element (e.g., a web browser) to render the at least one element. In contrast, when the decryption manager 107 determines that the at least another entropy value does not substantially meet the one or more entropy thresholds (e.g., the at least another entropy value has not decreased), the decryption manager 107 may determine to either cause, at least in part, a further decryption of the at least one decrypted element or determine a failed completion of the decryption (e.g., after one or more recursive attempts).

FIG. 4 depicts a process 400 of determining whether to render the at least one element. In one embodiment, the decryption platform 103/decryption manager 107 performs the process 400 and is implemented in, for instance, a chip set including a processor and a memory as shown in FIG. 8. In step 401, the decryption manager 107 causes, at least in part, a further decryption of the at least one decrypted element to generate at least one further decrypted element based, at least in part, on a comparison of the least another entropy value against the one or more entropy threshold values. In particular, if the decryption manager 107 determines that the another entropy value has not sufficiently decreased, the decryption manager 107 may attempt to decrypt the at least one decrypted element using the one or more certificates, the one or more keys, or a combination not previously used by the decryption manager 107 to cause, at least in part, the decryption of the at least one element.

In step 403, the decryption manager 107 optionally causes, at least in part, a recursive decryption of the at least one element, the at least one decrypted element, or a combination thereof based, at least in part, on the one or more entropy thresholds. By way of example, the decryption manager 107 can attempt to decrypt the at least one element, the at least one decrypted element, or a combination thereof using one or more keys in successive order (e.g., Key 1, Key 2, Key 3, etc.) until the decryption manager 107 determines a successful completion (e.g., "Here is the decrypted message") or until in step 405 the decryption manager 107 determines the failed completion of the decryption of the at least one element. More specifically, a failed completion is determined by the decryption manager 107 when the another entropy value for the at least one decrypted element fails to decrease upon further decryption attempts (e.g., the recursive decryption).

In step 407, the decryption manager 107 determines whether to cause, at least in part, a rendering of the at least one element based, at least in part, on a successful completion or a failed completion of the decryption of the at least one element, wherein the successful completion or the failed completion is based, at least in part, on a comparison of the at least another entropy value associated with the at least one decrypted element against the one or more entropy threshold values. As previously discussed, a successful completion is determined by the decryption manager 107 when the another entropy value for the at least one decrypted element decreases relative to the at least one entropy value (i.e., the encrypted text becomes sufficiently less random). By way of example, if the decryption manager 107 determines that the another entropy value is now below the one or more entropy threshold values (e.g., 0.65), the decryption manager 107 can cause, at least in part, a display of the result of the decryption (e.g., "Here is the decrypted message") and the decryption manager 107 will not make any further decryption attempts. Alternatively, a failed completion is determined by the decryption manager 107 when the another entropy value for the at least one decrypted element fails to decrease upon further decryption attempts. If all attempts by the decryption manager 107 fail, then the decryption manager 107 can determine not to display the at least one element.

In step 409, the decryption manager 107 optionally causes, at least in part, a presentation of one or more hints, one or more requests for decryption information, summary information, or a combination thereof associated with the at least one element. By way of example, the decryption manager 107 can cause, at least in part, the application presenting the at least one element (e.g., a web browser) to display a hint about the content of the encrypted information (e.g., "Hidden Content—click here") or trigger one or more further processes with one or more user supplied decryption keys or a change in the one or more entropy threshold values. In addition, the decryption manager 107 may store this information in an application 109 (e.g., a web browser) or in a cookie form in the decryption database 111, or a combination thereof for future reference.

Figure 5:
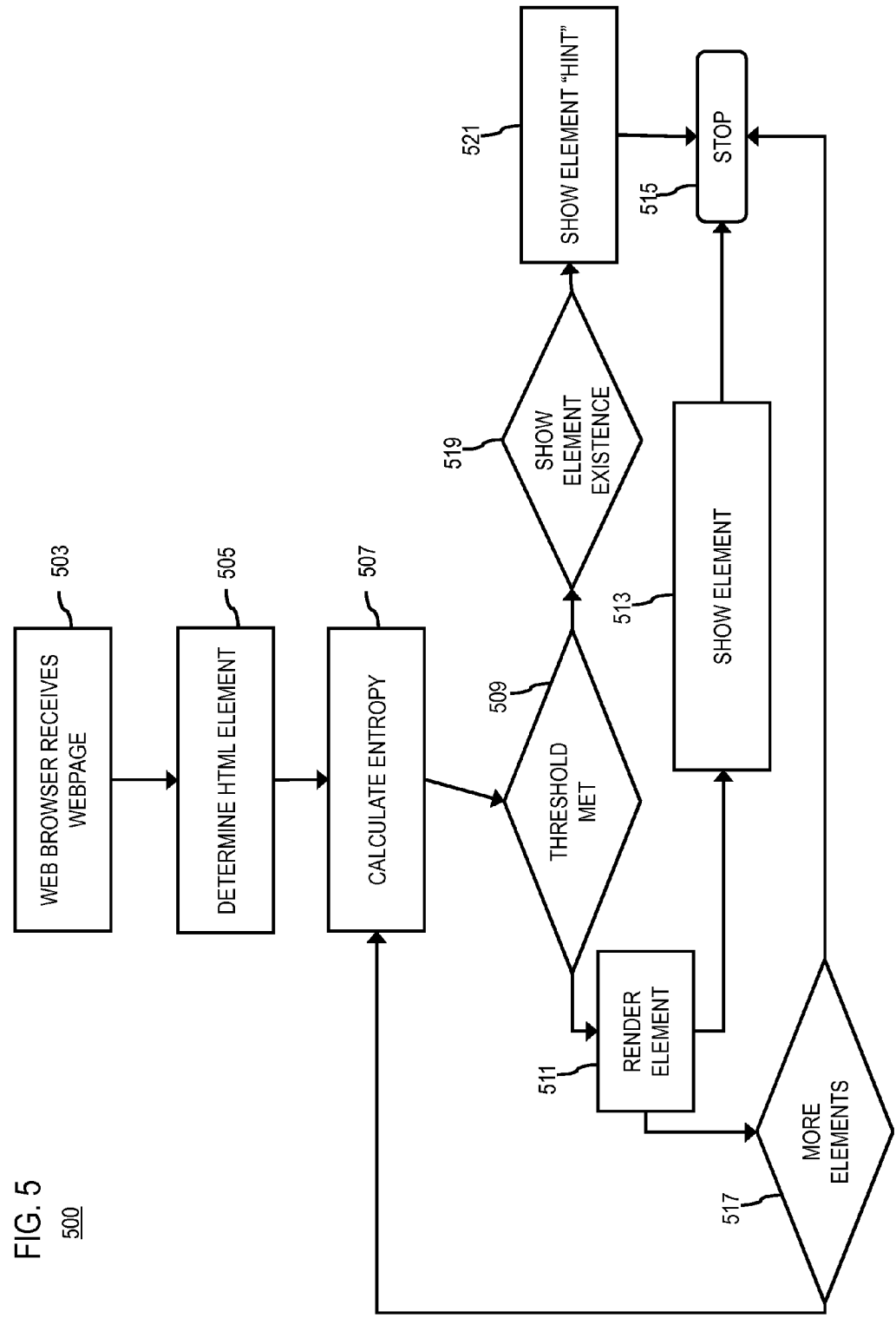
FIG. 5 is a diagram of a workflow for enabling a web browser to decrypt and to display encrypted information based on entropy calculations of the information, according to various embodiments.

FIG. 5 is a diagram of a workflow for enabling a web browser to decrypt and to display encrypted information based on entropy calculations of the information, according to various embodiments. By way of example, the workflow process 500 is applicable to a user navigating to at least one webpage using a web browser. In step 501, the system 100 first determines the entropy model based, at least in part, on one or more languages associated with the at least one element of at least one webpage, the at least one webpage, or a combination thereof. In step 505, the system 100 determines the at least one element within one or more HTML division tags (e.g., <div> and </div>) of the at least one webpage, for example. In this example use case, the one or more division tags may include, at least in part, at least one non-encrypted element (e.g., <div>Hello There</div>) and/or at least one encrypted element (e.g., <div>9834570238947590235089235089235792</div>). In step 507, the system 100 determines the at least one entropy value for respective the at least one elements. As previously discussed, the at least one entropy value is based, at least in part, on the determination of by the system 100 of the randomness of the at least one element with respect to the previously determined entropy model. In step 509, the system 100 first determines one or more entropy thresholds (e.g., 0.7, between 0.7 and 0.9, and 0.9 to 1) based, at least in part, on the one or more languages of the at least one webpage. The system 100 then causes, at least in part, a comparison of the at least one entropy value of the at least one element against one or more entropy threshold values. By way of example, if the system 100 determines that the first division section (e.g., <div>Hello There</div>) has an entropy value below the one or more entropy threshold values (e.g., 0.65), then in step 511, the system 100 can render the at least one element. Thereafter in step 513, the system 100 can display the at least one element using an application for presenting the at least one element, the at least one webpage, or a combination thereof (e.g., a web browser) before stopping the process in step 515.

Alternatively, in step 509, if the system 100 determines that the second division section (e.g., <div>98345702389475902350892350892350892350892350892359792</div>) has an entropy value above the one or more threshold values (e.g., 0.95), the system 100 causes, at least in part, a decryption of the element in step 511 to generate at least one decrypted element in step 517. In particular, the system 100 includes or has access to one or more certificates, one or more keys, or a combination thereof. In certain embodiments, the system 100 next determines at least another entropy value for the at least one decrypted element corresponding to step 507. If the system 100 determines that the another entropy value corresponding to step 507 has not sufficiently decreased, then the system 100 can cause, at least in part, a further decryption of the at least one decrypted element in step 511 to generate at least one further decrypted element. More specifically, the system 100 can attempt to decrypt the at least one decrypted element in step 511 using the one or more certificates, the one or more keys, or a combination thereof not previously used by the system 100 to cause, at least in part the decryption of the at least one element. In one or more embodiments, based on the results of the at least another entropy value, the system 100 determines whether to cause, at least in part, a rendering in step 511 and then a display in step 513 of the at least one element based, at least in part, on a successful completion (e.g., "Here is the decrypted message") or a failed completion of the decryption of the at least one element (e.g., (e.g., "98345702389475902350892350892350892350892350892359792"). In step 519, if the system 100 determines the failed completion of the decryption of the at least one element (e.g., the another entropy value fails to lower), then the system 100 can show the existence of the at least one element or in step 521, cause, at least in part, a presentation of one or more hints, one or more requests for decryption information, summary information, or a combination thereof associated with the at least one element. For example, in step 521, the system 100 can cause, at least in part, the application presenting the at least one element (e.g., a web browser) to display a hint about the content of the encrypted information (e.g., "Hidden Content—click here"). However, if all attempts by the system 100 fail, then the system 100 can determine not to display the at least one element corresponding to step 515.

Figure 6:
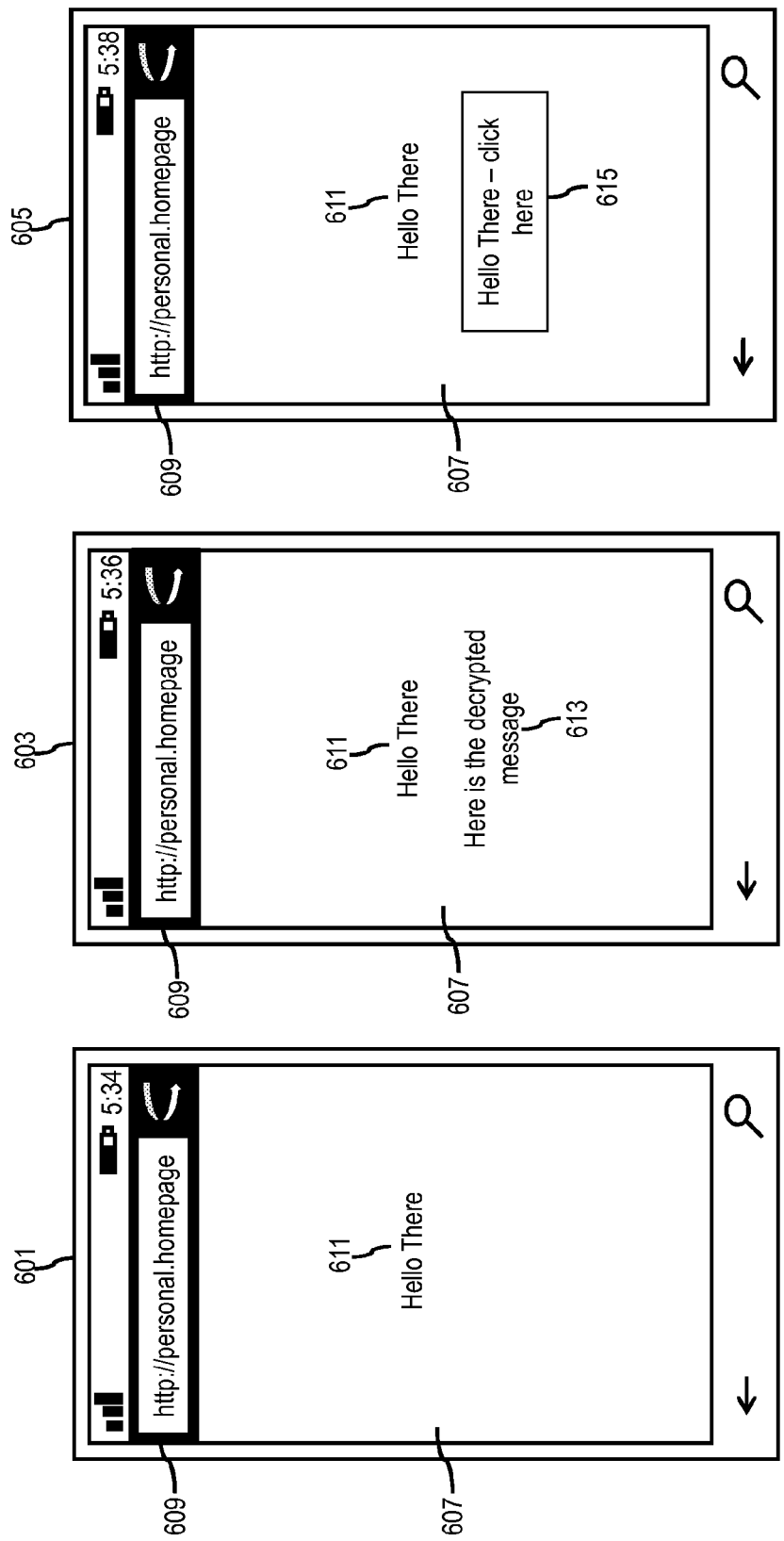
FIG. 6 is a diagram of user interfaces utilized in the processes of FIGS. 3 and 4, according to various embodiments.

FIG. 6 is a diagram of user interfaces utilized in the processes of FIGS. 3 and 4, according to various embodiments. As shown, the example user interfaces of FIG. 6 include one or more user interface elements and/or functionalities created and/or modified based, at least in part, on information, data, and/or signals resulting from the processes (e.g., processes 300 and 400) described with respect to FIGS. 3 and 4. More specifically, FIG. 6 illustrates three user interfaces (e.g., interfaces 601, 603, and 605) depicting non-encrypted and encrypted information associated with a webpage 607.

In one embodiment, the system 100 first determines the entropy model based, at least in part, on one or more languages (e.g., English (US)+HTML) associated with at least one element of at least one webpage 607 (e.g., personal-.homepage) depicted in the search bar of the application 609 (e.g., a web browser). As previously discussed, the one or more HTML division tags may include, at least in part, at least one non-encrypted element (e.g., <div>Hello There</div>) and/or at least one encrypted element (e.g., <div>98345702389475902350892350892350892350892350892359792</div>). In one or more embodiments, the system 100 next determines one or more entropy thresholds based, at least in part, on the one or more languages of the at least one webpage 607. By way of example, the system 100 can determine that the one or more entropy threshold values fall on a scale of 0 to 1, wherein an entropy value less than 0.7 represents English (US) text and an entropy value greater than 0.9 represents random and likely encrypted text. In one embodiment, the system 100 then processes and/or facilitates a processing of the at least one element to determine one or more decryption parameters, one or more entropy calculation parameters, or a combination thereof, wherein the determining of the at least one entropy value, the decryption of the at least one element, or a combination thereof is based, at least in part, on the one or more decryption parameters, the one or more entropy calculation parameters, or a combination thereof. In particular, the one or more decryption parameters include, at least in part, one or more certificates, one or more keys, or a combination thereof associated with the web browser 609.

In one or more embodiments, the system 100 then determines the at least one entropy value for the at least one element. More specifically, the determining of the of the at least one entropy value, the decryption of the at least one element, or a combination thereof is performed by the web browser 609 or another suitable mechanism for browsing the Internet. As previously discussed, the at least one entropy value is based, at least in part, on the determination by the system 100 of the randomness of the at least one element with respect to the previously determined entropy model. By way of example, as depicted in interface 601, if the system 100 determines that the first division section (e.g., <div>Hello There</div>) has an entropy value below the one or more entropy threshold values (e.g., 0.65), then the system 100 can cause, at least in part, the web browser 609 to render the at least one element 611. In contrast, if the system 100 determines that the second division section (e.g., <div>98345702389475902350892350892350892350892350892359792</div>) has an entropy value above the one or more threshold values (e.g., 0.95), then the system 100 causes, at least in part, a decryption of the at least one element to generate at least one decrypted element.

In certain embodiments, the system 100 next determines at least one entropy value for the at least one decrypted element (e.g., the result of decrypting the second division section). In particular, the system 100 determines the at least another entropy value using the same process for determining the at least one entropy value, except in this instance, the system 100 is attempting to determine whether the at least another entropy value has now decreased relative to the at least one entropy value (i.e., the encrypted text has become less random as a result of decryption). In one embodiment, if the system 100 determines that the another entropy value has not sufficiently decreased, then the system 100 can cause, at least in part, a further decryption of the at least one decrypted element to generate at least one further decrypted element. For example, the system 100 can attempt to decrypt the at least one decrypted element using the one or more certificates, the one or more keys, or a combination thereof not previously used by the system 100 to cause, at least in part, the decryption of the at least one element.

In one or more embodiments, based on the results of the at least another entropy value, the system 100 determines whether to cause, at least in part, a rendering of the at least one element based, at least in part, on a successful completion (e.g., message 613 of interface 603 "Here is the decrypted message") or a failed completion of the decryption of the at least one element. As previously discussed, a successful completion is determined by the system 100 when the another entropy value for the at least one decrypted element decreases relative to the at least one entropy value (i.e., the encrypted text becomes sufficiently less random). In contrast, a failed completion is determined by the system 100 when the another entropy value for the at least one decrypted element fails to decrease upon further decryption attempts. If all attempts by the system 100 fail, then the system 100 can determine not to display the at least one element. In certain embodiments, if the system 100 determines the failed completion of the decryption of the at least one element, then the system 100 can cause, at least in part, a presentation of one or more hints (e.g., hint 615 of interface 605 "Hidden Content—click here"), one or more requests for decryption information, summary information, or a combination thereof associated with the at least one request.

The processes described herein for enabling a web browser to decrypt and to display encrypted information based on entropy calculations of the information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
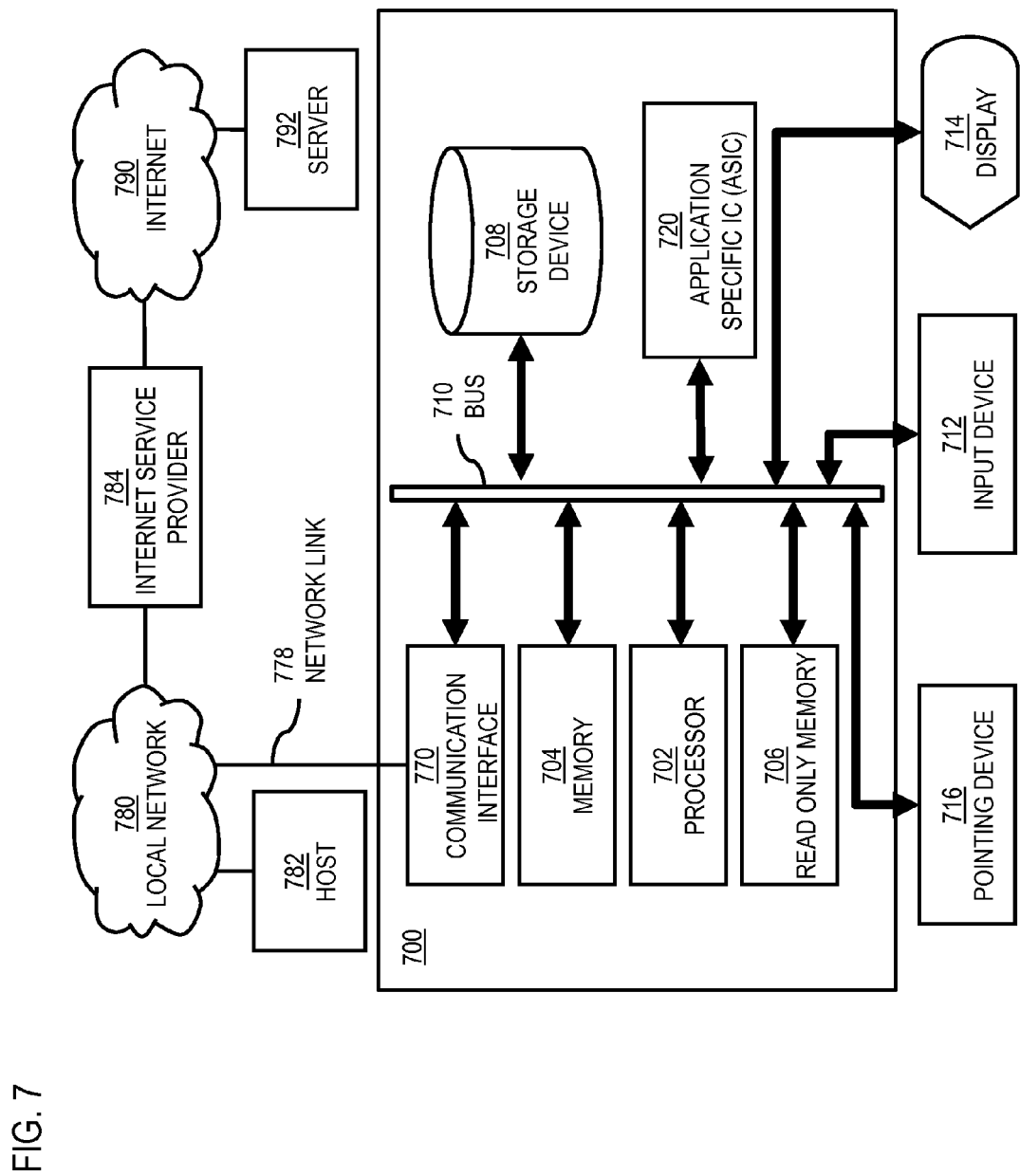
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to enable a web browser to decrypt and to display encrypted information based on entropy calculations of the information as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of enabling a web browser to decrypt and to display encrypted information based on entropy calculations of the information.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to enable a web browser to decrypt and to display encrypted information based on entropy calculations of the information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for enabling a web browser to decrypt and to display encrypted information based on entropy calculations of the information. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for enabling a web browser to decrypt and to display encrypted information based on entropy calculations of the information, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for enabling a web browser to decrypt and to display encrypted information based on entropy calculations of the information to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to enable a web browser to decrypt and to display encrypted information based on entropy calculations of the information as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of enabling a web browser to decrypt and to display encrypted information based on entropy calculations of the information.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to perform specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to enable a web browser to decrypt and to display encrypted information based on entropy calculations of the information. The memory 805 also stores the data associated with or generated by the execution of the inventive steps.

Figure 9:
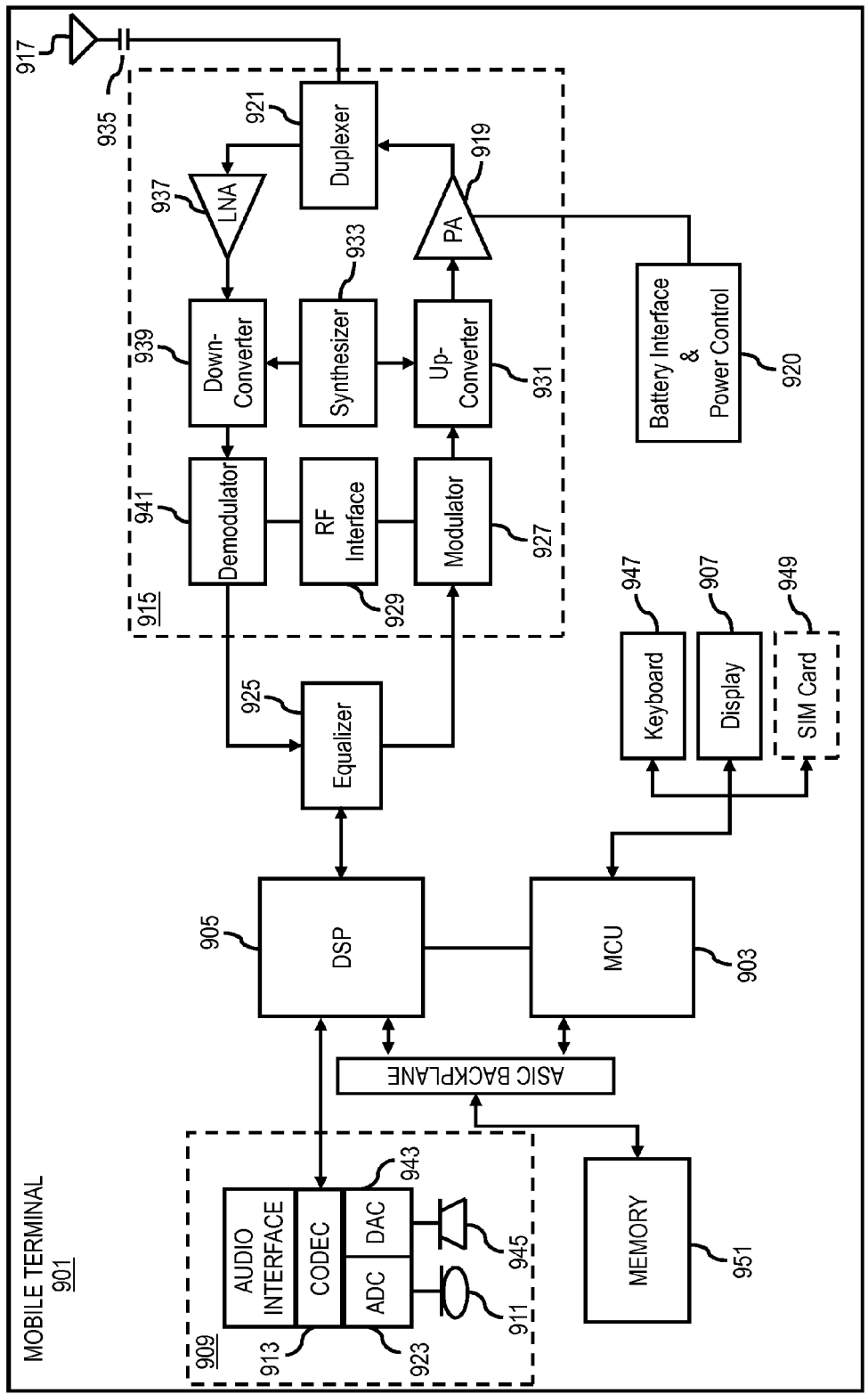
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of enabling a web browser to decrypt and to display encrypted information based on entropy calculations of the information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of enabling a web browser to decrypt and to display encrypted information based on entropy calculations of the information. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to enable a web browser to decrypt and to display encrypted information based on entropy calculations of the information. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

at least one determination of at least one entropy value for at least one element of at least one webpage by a web browser application receiving the at least one element of at least one webpage;

a decryption of the at least one element received by the web browser to generate at least one decrypted element based, at least in part, on a comparison of the at least one entropy value against one or more entropy threshold values; and at least one determination of whether to cause, at least in part, a rendering of the at least one element based, at least in part, on a determination of a successful completion or a failed completion of the decryption of the at least one element, wherein the determination of the successful completion or the failed completion is based, at least in part, on a comparison of the at least another entropy value associated with the at least one decrypted element against the one or more entropy threshold values, and wherein at least one decrypted element is associated with at least one other entropy value that is less than the at least one entropy value.

2. A method of claim 1, wherein the (1) data and/or (2) information and/or (3) at least one signal are further based, at least in part, on the following:

at least one determination of at least another entropy value for the at least one decrypted element; and a further decryption of the at least one decrypted element to generate at least one further decrypted element based, at least in part, on a comparison of the at least another entropy value against the one or more entropy threshold values.

3. A method of claim 2, wherein the (1) data and/or (2) information and/or (3) at least one signal are further based, at least in part, on the following:

at least one determination of the at least one entropy value, the at least another entropy value, or a combination thereof do not at least substantially meet the one or more entropy thresholds; and a recursive decryption of the at least one element, the at least one decrypted element, or a combination thereof based, at least in part, on the one or more entropy thresholds.

4. A method of claim 1, wherein the (1) data and/or (2) information and/or (3) at least one signal are further based, at least in part, on the following:

at least one determination of one or more languages associated with the at least one element, the at least one webpage, or a combination thereof; and at least one determination of the one or more entropy thresholds based, at least in part, on the one or more languages.

5. A method of claim 1, wherein the (1) data and/or (2) information and/or (3) at least one signal are further based, at least in part, on the following:

a processing of the at least one element to determine one or more decryption parameters, one or more entropy calculation parameters, or a combination thereof, wherein the determining of the at least one entropy value, the decryption of the at least one element, or a combination thereof is based, at least in part, on the one or more decryption parameters, the one or more entropy calculation parameters, or a combination thereof.

6. A method of claim 5, wherein the (1) data and/or (2) information and/or (3) at least one signal are further based, at least in part, on the following:

a processing of the at least one element via one or more syntactic analyses, one or more semantic analyses, or a combination thereof to determine the one or more decryption parameters, the one or more entropy calculation parameters, or a combination thereof.

7. A method of claim 5, wherein the one or more decryption parameters include, at least in part, one or more certificates, one or more keys, or a combination thereof associated with an application presenting the at least one element, the at least one webpage, or a combination thereof.

8. A method of claim 1, wherein the (1) data and/or (2) information and/or (3) at least one signal are further based, at least in part, on the following:

at least one determination of a failed completion of the decryption of the at least one element; and a presentation of one or more hints, one or more requests for decryption information, summary information, or a combination thereof associated with the at least one element in response to the failed completion.

9. A method of claim 1, wherein the determining of the at least one entropy value, the decryption of the at least one element, or a combination thereof is performed by an application presenting the at least one element, the at least one webpage, or a combination thereof.

10. An apparatus comprising:

at least one processor selected from a Digital Signal Processing (DSP) chip, an Application Specific Integrated Circuit (ASIC), or Field Programmable Gate Arrays (FPGAs); and at least one memory including computer program code for one or more programs, the at least one memory and the computer program code configured to, with the at least one processor, cause the apparatus to perform at least the following, determine at least one entropy value for at least one element of at least one webpage;

cause, at least in part, a decryption of the at least one element to generate at least one decrypted element based, at least in part, on a comparison of the at least one entropy value against one or more entropy threshold values; and determine whether to cause, at least in part, a rendering of the at least one element based, at least in part, on a determination of a successful completion or a failed completion of the decryption of the at least one element, wherein the determination of the successful completion or the failed completion is based, at least in part, on a comparison of the at least another entropy value associated with the at least one decrypted element against the one or more entropy threshold values, and wherein at least one decrypted element is associated with at least one other entropy value that is less than the at least one entropy value.

11. An apparatus of claim 10, wherein the apparatus is further caused to:

determine at least another entropy value for the at least one decrypted element; and cause, at least in part, a further decryption of the at least one decrypted element to generate at least one further decrypted element based, at least in part, on a comparison of the at least another entropy value against the one or more entropy threshold values.

12. An apparatus of claim 11, wherein the apparatus is further caused to:

determine the at least one entropy value, the at least another entropy value, or a combination thereof do not at least substantially meet the one or more entropy thresholds; and cause, at least in part, a recursive decryption of the at least one element, the at least one decrypted element, or a combination thereof based, at least in part, on the one or more entropy thresholds.

13. An apparatus of claim 10, wherein the apparatus is further caused to:

determine one or more languages associated with the at least one element, the at least one webpage, or a combination thereof; and determine the one or more entropy thresholds based, at least in part, on the one or more languages.

14. An apparatus of claim 10, wherein the apparatus is further caused to:

process and/or facilitate a processing of the at least one element to determine one or more decryption parameters, one or more entropy calculation parameters, or a combination thereof, wherein the determining of the at least one entropy value, the decryption of the at least one element, or a combination thereof is based, at least in part, on the one or more decryption parameters, the one or more entropy calculation parameters, or a combination thereof.

15. An apparatus of claim 14, wherein the apparatus is further caused to:

process and/or facilitate a processing of the at least one element via one or more syntactic analyses, one or more semantic analyses, or a combination thereof to determine the one or more decryption parameters, the one or more entropy calculation parameters, or a combination thereof.

16. An apparatus of claim 14, wherein the one or more decryption parameters include, at least in part, one or more certificates, one or more keys, or a combination thereof associated with an application presenting the at least one element, the at least one webpage, or a combination thereof.

17. An apparatus of claim 10, wherein the apparatus is further caused to:

determine a failed completion of the decryption of the at least one element; and cause, at least in part, a presentation of one or more hints, one or more requests for decryption information, summary information, or a combination thereof associated with the at least one element in response to the failed completion.

18. An apparatus of claim 10, wherein the determining of the at least one entropy value, the decryption of the at least one element, or a combination thereof is performed by an application presenting the at least one element, the at least one webpage, or a combination thereof.

19. A method of claim 1 wherein the (1) data and/or (2) information and/or (3) at least one signal are further based, at least in part, on the following:

at least one determination of a failed completion of the decryption of the at least one element; and a determination to not display the element in response to the failed completion.

* * * * *